Sept. 22, 1936.    A. E. FERAGEN    2,055,430
MOTOR VEHICLE TESTING APPARATUS
Filed Nov. 23, 1932
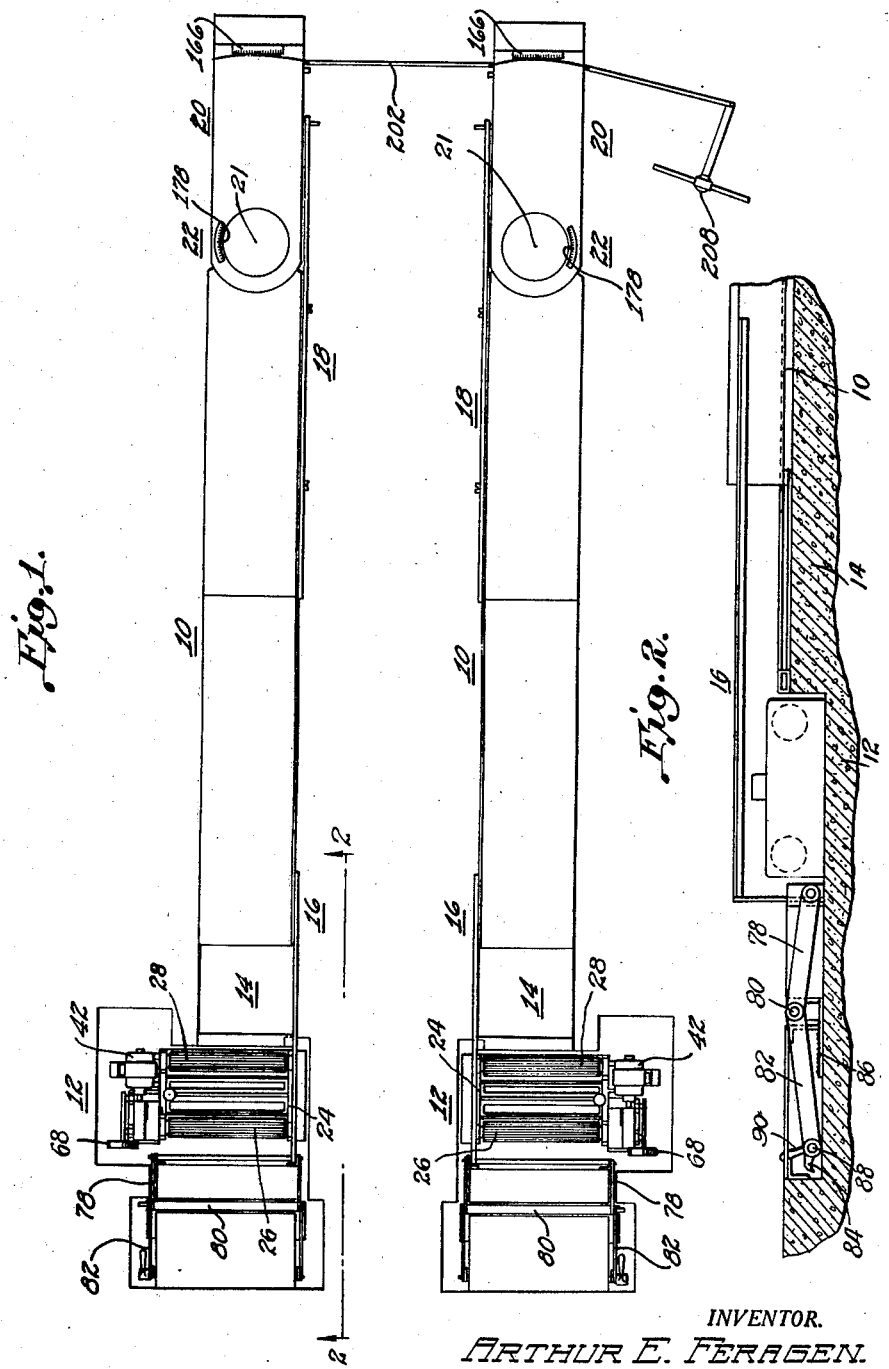
INVENTOR.
ARTHUR E. FERAGEN.
BY
ATTORNEYS.

Patented Sept. 22, 1936

2,055,430

UNITED STATES PATENT OFFICE 2,055,430

MOTOR VEHICLE TESTING APPARATUS

Arthur E. Feragen, South Bend, Ind.

Application November 23, 1932, Serial No. 644,133

1 Claim. (Cl. 73—51)

This invention relates to a motor vehicle testing apparatus.

An object of the invention is to provide a runway for a motor vehicle having means included therein for thoroughly testing the vehicle to quickly locate defects therein and to expedite the work of repair, care and maintenance of the vehicle and more particularly to provide an apparatus for testing motor vehicles comprising a runway including means for testing the brakes of the vehicle together with means for retaining the vehicle in position against the thrust of the brake testing means., Other objects of the invention will appear from the following description taken in connection with the drawing which forms a part of this specification, and in which, Figure 1 is a top plan view of the machine; and Figure 2 is an enlarged detail view substantially on line 2—2, Figure 1.

Referring to the drawing for more specific details of the invention, 10 represents two corresponding parallel runways, each including a brake testing unit 12, a laterally shiftable platform 14, a stationary measuring means 16, a longitudinally slidable measuring means 18, and a wheel aligner 20 rotatable about the axes 21 including a rotatable platform 22, centered on the rotatable axes 21, the wheel aligner in one runway being coupled to the wheel aligner in the other runway for concomitant and corresponding movements.

The brake tester units 12 are positioned at the front or approach of the runways. Each of these units includes a frame 24 suitably secured against displacement. The frame has positioned thereon for rotation two correspondingly spaced parallel rollers 26 and 28 adaptable for supporting and rotating the wheel of a motor vehicle. One of the rollers, preferably roller 26, is driven by an electric motor 42 the drive means incorporating a suitable indicator 68 for indicating the torque necessary to rotate the rollers 26 and 28.

It is essential that the motor vehicle wheels be retained on the rollers 26 and 28, and to this end spaced corresponding parallel links 78 are pivoted to a suitable support adjacent the frame 24. These links support for rotation a roller 80 adapted to engage the vehicle wheels when on the rollers 26 and 28. Corresponding links 82 pivoted on a shaft supporting the roller 80 have dogs 84 on their free ends for engagement with ratchets 86. The links 82 are connected by a cross-bar 88 and this bar has secured thereto a handle 90 for raising the roller 80 for engagement with the wheels and disengaging the dogs from the ratchets.

In operation, a motor vehicle is driven under its own power to positon the front wheels of the vehicle on the brake tester units 12, in which position the vehicle is secured against movement by elevating the rollers 80 to engage the wheels. The brake tester units are then set in operation to indicates the resistance of the brakes associated with the front wheels to the rotation of the wheels to facilitate adjustment of the brakes.

Upon adjustment of the brakes associated with the front wheels, the rollers 80 are lowered and the vehicle moved forward to position the rear wheels on the brake testing units, whereupon the rollers 80 are again elevated to engage the wheels to secure the vehicle against movement, and the brake testing units are again set in operation to test the brakes associated with the rear wheels to facilitate the required adjustment thereof.

The laterally shiftable platforms 14 are provided to laterally shift the vehicle wheels mounted thereon to align the motor vehicle with the runways so as to properly position the vehicle in order that the measuring means 16 and 18 may be used.

The measuring means 16 and 18 carry distance measuring scales thereon, the forward means 18 being longitudinally slidable to accommodate vehicles of different length wheel base. The scales on 16 and 18 are provided in order to determine the alignment of the vehicle frame and to determine the relation of the front and rear axles to each other and to the frame.

At the forward end of the runways 10 are mounted means for determining wheel alignment. The pivotally mounted discs 22 cooperating with scales 178 are provided for checking the caster of the vehicle wheels and checking the king-pin inclination. The pivotally mounted platforms 20 cooperating with scales 166 are provided for determining toe-in of the vehicle wheels.

The platforms 20 are connected by rod 202 and by means of handle 208 may be rotated about their pivots 21 in order to properly position the platforms 20 for checking the steering geometry on right and left turns.

Although this invention has been described in connection with certain specific embodiments the principles involved are susceptible of numerous other applications that would readily occur to persons skilled in the art. The invention is, therefore, to be limited only as indicated by the scope of the appended claim.

Having thus described the various features of the invention, what I claim as new and desire to secure by Letters Patent is:—

A motor vehicle testing apparatus comprising two parallel runways each having a brake testing unit at one end, said brake testing units being adapted to rotate the wheels of a vehicle engaged thereby against the resistance of the wheel brakes, and means adjacent the brake testing units for restraining movement of the vehicle during testing of the brakes, said means comprising a transverse roller carried on a pair of parallel links pivoted adjacent the brake testing units, a second link pivotally connected to said parallel links fixed to support said roller in the path of a vehicle wheel, and a fixed notch adapted to releasably engage said link whereby the roller may be raised into position to engage the vehicle wheel while on the brake testing machine, or lowered to permit the vehicle to readily pass thereover.

ARTHUR E. FERAGEN.